United States Patent Office 3,457,034
Patented July 22, 1969

3,457,034
PROCESS FOR EXTRACTING TUNGSTEN VALUES
FROM MATERIAL CONTAINING SAME
Alan Dennis Pittuck, Ottawa, Ontario, Canada, assignor to Eldorado Mining and Refining Limited, Ottawa, Ontario, Canada, a corporation of Canada
No Drawing. Filed June 1, 1966, Ser. No. 554,338
Claims priority, application Canada, Feb. 10, 1966, 951,956
Int. Cl. C01c 1/28; C01g 41/00
U.S. Cl. 23—18
4 Claims

ABSTRACT OF THE DISCLOSURE

Process for decomposing finely ground scheelite in which the scheelite is heated to a temperature of at least 80° C. in nitric acid having an initial concentration in the range of 4 N to 8 N to form a calcium nitrate solution and a crude tungstic acid residue. The tungstic acid residue is separated from the solution and then dissolved in ammonium hydroxide after which the tungsten values are recovered from a substantially neutral solution as ammonium paratungstate.

---

This invention relates to a process for the recovery of tungsten values from tungsten-containing ores and minerals.

Tungsten-bearing ores are generally classified in two principal groups: The wolframite group and the scheelite group. Scheelite itself is the only commercially significant member of the scheelite group or ores, though certain other minerals in this group are of some significance, viz, powellite, stalzite, raspite, wulfenite, chillagite, tungstenite, hollandite, etc. The process of the present invention is operative for the recovery of tungsten values from any of the ores and minerals of the scheelite group.

One conventional technique for working up tungsten-bearing ores usually involves the solubilization of the tungsten values in the form of sodium or potassium tungstates which are then purified by a series of repeated crystallizations as ammonium para-tungstate or tungstic acid. This is usually done by decomposing the ore concentrate, obtained from such conventional ore dressing techniques as gravity concentration, flotation, magnetic separation, or the like, under pressure wtih an aqueous alkaline solution, such as aqueous sodium carbonate, potassium carbonate, or sodium hydroxide. Sometimes the ore concentrate is simply fused with the solid alkaline reagent. The ore concentrates have also been decomposed with certain strong acids, e.g. mineral acids containing orthophosphoric acid, or a mixture of hydrochloric and nitric acid.

While these and related recovery techniques have met with varying degrees of success in recovering tungsten from tungsten-bearing ores and minerals, they also have many disadvantages. For example, they tend to be rather cumbersome and costly with relatively low yields.

According to this invention, it has been found that there are very important advantages to be obtained in recovering tungsten values from tungsten-bearing ores and minerals by decomposition in nitric acid at elevated temperatures. This nitric acid decomposition results in tungstic acid containing a number of impurities which are then removed by known techniques.

According to the process of the invention, a finely ground scheelite concentrate was slurried with nitric acid and agitated to keep the solids in suspension for a fixed period of time at an elevated temperature after which it was filtered and the residue washed with water. The crude tungstic acid formed (as residue) was then treated to remove impurities by being dissolved in ammonium hydroxide, filtering off insolubles and recovering ammonium paratungstate from neutral solutions. In some cases unreacted schelite which remained after the dissolution of the tungstic acid in ammonia was treated with a solution of sodium hydroxide thereby effecting further decomposition. The caustic solution was then treated with sufficient nitric acid to precipitate the soluble tungsten as tungstic acid. The washed precipitate was then further treated with ammonium hydroxide and the solution added to the main ammonia-tungsten solution.

Temperature was found to have a substantial effect on the efficiency of the decomposition and the ultimate tungsten yield was found to increase with elevation of the temperature during the decomposition step. It is especially convenient to operate in the vicinity of the boiling point of the acid solution and excellent results have been obtained at 100° C. The decomposition vessel can, of course, be pressurized, to obtain higher temperatures. A temperature in the neighborhood of about 80° C. represents a practical lower limit for the decomposition since the process proceeds too slowly at lower temperatures to be of any commercial significance.

Optimum decomposition periods will vary from case to case depending upon the composition of the feed material. For the work-up of most ores, digestion times of two to four hours are quite adequate, and yields are not appreciably increased by extending the decomposition period beyond this range.

Other process limitations which have a significant effect on yields are nitric acid concentration and pulp density of the ore solids in the acid. Highly satisfactory results were obtained with an initial nitric acid concentration in the range 4 N to 8 N and a pulp density in the range of about 20 to about 35% solids.

The decomposition process of this invention provides the following important advantages over known decomposition methods:

(a) High decomposition yields are obtainable;

(b) Most of the free or excess decomposition reagent may be recovered by treatment with sulphuric acid and subsequent distillation;

(c) Reagent consumption and therefore costs are lower than those of conventional methods; and (d) Unreacted ore remaining at the end of the decomposition period may be further treated.

The invention will now be illustrated by reference to a series of specific examples. In the examples, tests were conducted on a scheelite concentrate having the analysis given in Table I below.

TABLE I

| Element: | Percent |
|---|---|
| Ag | <0.005 |
| Al | 0.4 |
| As | 0.01 |
| B | <0.005 |
| Be | <0.001 |
| Bi | [1] 0.03 |
| Ca | [1] 13.08 |
| Cd | <0.01 |
| Co | 0.005 |
| Cr | <0.005 |
| Cu | [1] 0.01 |
| Fe | [1] 0.64 |
| Mg | 0.1 |
| Mm | 0.05 |
| Mn | 0.05 |
| Mo | [1] 0.014 |
| Ni | <0.005 |
| P | <0.5 |
| Pb | 0.005 |
| S | [1] 0.22 |
| Sb | 0.01 |
| Si | 0.3 |
| Sn | 0.03 |
| V | 0.001 |
| W | [1] 62.0 |
| Zn | <0.5 |

[1] Chemical analysis.
All others—semiquantitative spectrographic analysis.

Example 1.—Retention time (a) 100 g. of scheelite concentrate of the above composition was slurried with 200 ml. of 8 N nitric acid at 100° C. with enough agitation to keep the solids in suspension. The slurry was agitated for a period of 4 hours after which it was filtered and the residue washed with water. Subsequent analysis showed a decomposition yield of 97.9% with an acid consumption of 0.47 lb. $HNO_3$/lb. conc.

(b) The above test was repeated with different retention times and a comparison of the results obtained for the various retention times is given in Table II below. The percent distribution of calcium in the liquor illustrates the degree of decomposition of the scheelite.

TABLE II

| Retention time (hours) | Temp., °C. | Percent distribution | | | |
|---|---|---|---|---|---|
| | | Liquor | | Residue | |
| | | W | Ca | W | Ca |
| 0.5 | 100 | 0.52 | 62.4 | 99.48 | 37.6 |
| 1 | 100 | 0.44 | 79.2 | 99.56 | 20.8 |
| 1 | 100 | 0.46 | 97.5 | 99.54 | 2.5 |
| 4 | 100 | 0.74 | 97.9 | 99.26 | 2.1 |

Example 2.—Acid concentration

The procedure of Example 1(a) was repeated at a variety of initial acid concentrations to determine the effect of this on yields. The results of these tests are given in Table III below.

TABLE III

| Initial Acid N | Final Acid N | Percent decomposition of Scheelite conc. | Acid consumed, lb. $HNO_3$/lb. conc. |
|---|---|---|---|
| 4.0 | 0.52 | 85.3 | 0.44 |
| 5.6 | 2.1 | 88.0 | 0.44 |
| 6.4 | 2.9 | 90.0 | 0.44 |
| 8.0 | 4.2 | 95.6 | 0.47 |
| 16 | 14.5 | 1.6 | 0.19 |

From the above table it will be seen that very slight decomposition was realized with concentrated nitric acid and that optimum results were obtained with 8 N nitric acid.

Example 3—Pulp density

The effect of pulp density on the decomposition of scheelite concentrate was observed by carrying out a series of test on 100 g. portions of the concentrate. 8 N nitric acid was used and the decomposition was carried out at 100° C. for a period of 3 hours. The results are shown in Table IV below.

TABLE IV

| Pulp density, percent solids | Percent decomposition of Scheelite conc. | Acid consumed, lb. $HNO_3$/lb. conc. |
|---|---|---|
| 20 | 93.5 | 0.49 |
| 25 | 95.3 | 0.45 |
| 33 | 97.7 | 0.42 |
| 40 | 46.0 | 0.30 |
| 50 | 19.1 | 0.25 |

Example 4.—Dissolution of tungstic acid in ammonium hydroxide

The residue obtained from Example 1 (a) was tungstic acid containing as impurities calcium, silica, alumina and some undecomposed scheelite. This crude tungstic acid was dissolved in aqueous ammonia, using 150 ml. of concentrated ammonium hydroxide (28% $NH_3$) per 200 g. of initial scheelite. The dissolution of the tungstic acid ceased after ½ hour contact time and the specific gravity of the ammonium tungstate solutions were adjusted to 1.112. The ammonium tungstate solutions, after adjustment of specific gravity, were in the order of 120–160 g. w./l.

Example 5.—Precipitation of ammonium para-tungstate

The tungsten was crystallized out of the solution obtained in Example 4 as crystals of ammonia para-tungstate. The effects of pH on the recovery of tungsten as ammonium para-tungstate are shown in Table V below.

TABLE V

| pH: | Percent recovery of tungsten |
|---|---|
| 7.3 | 84.9 |
| 6.5 | 96.6 |
| 6.0 | 95.6 |
| 5.5 | 94.0 |

From the above table it will be seen that a nearly neutral solution is desirable for best recovery with optimum recovery at a pH of 6.5.

Example 6.—Treatment of acid insoluble residue 60 g. of the undissolved residue from an ammonia leach similar to Example 4 were dissolved in 200 ml. of 35% w./w. NaOH (70 gm. NaOH in 200 ml. $H_2O$). The caustic liquor obtained was treated with 200 ml. of 8 N nitric acid to precipitate the tungsten as tungstic acid. This was dissolved in ammonium hydroxide and added to the main ammonium tungstate liquor.

Example 7

The tungsten product obtained by the above method contained the following impurities:

TABLE VI

| Impurity: | Amount, p.p.m. |
|---|---|
| Al | <5 |
| As | <10 |
| B | <10 |
| Bi | <1 |
| Ca | <1 |
| Cu | 2 |
| Fe | 20 |
| Mg | <1 |
| Mn | <1 |
| Mo | 65 |
| Si | <10 |
| Sn | <10 |
| Zn | <50 |

What I claim as my invention is:

1. A process for the decomposition of finely ground scheelite which comprises forming a slurry containing 20 to 40% of said scheelite in nitric acid having a concentration in the range of 4 N to 8 N, heating the slurry to a temperature of at least 80° C. to form a solution containing calcium nitrate and a crude tungstic acid residue, separating the tungstic acid residue from the solution, dissolving the residue in ammonium hydroxide and recovering tungsten values from a substantially neutral solution as ammonium para-tungstate.

2. A process according to claim 1 wherein unreacted scheelite which remains after the dissolution of the tungstic acid in ammonium hydroxide is treated with a solution of sodium hydroxide and the caustic solution thus formed was then treated with nitric acid to precipitate the soluble tungsten as tungstic acid.

3. A process according to claim 1 wherein the scheelite in nitric acid is heated to 100° C. for a period of 2 to 4 hours.

4. A process according to claim 1 wherein the substantially neutral solution has a pH of 6.5.

References Cited

UNITED STATES PATENTS

| | | |
|---|---|---|
| 1,410,584 | 3/1922 | Lubowsky. |
| 1,483,567 | 2/1924 | Anjow. |
| 2,801,152 | 7/1957 | Kasey _____ 23—19 |

FOREIGN PATENTS 595,197  11/1947  Great Britain.

OTHER REFERENCES

Hampel: "Rare Metals Handbook," Reinhold Pub. Corp., New York, 1954, page 486.

HERBERT T. CARTER, Primary Examiner

U.S. Cl. X.R.

23—19, 51, 102, 140